United States Patent [19]
Constancis

[11] Patent Number: 5,930,739
[45] Date of Patent: Jul. 27, 1999

[54] METHOD FOR MEASURING THE YAW VELOCITY OF A VEHICLE

[75] Inventor: Pierre Constancis, Poissy, France

[73] Assignee: Regie Nationale Des Usines Renault, Boulogne-Billancourt, France

[21] Appl. No.: 08/930,573

[22] PCT Filed: Apr. 5, 1996

[86] PCT No.: PCT/FR96/00522

§ 371 Date: Dec. 29, 1997

§ 102(e) Date: Dec. 29, 1997

[87] PCT Pub. No.: WO96/31783

PCT Pub. Date: Oct. 10, 1996

[30] Foreign Application Priority Data

Apr. 7, 1995 [FR] France .................................. 95 04156

[51] Int. Cl.⁶ ....................................................... G01P 3/44
[52] U.S. Cl. ........................... 702/145; 702/143; 702/147
[58] Field of Search ..................................... 702/145, 142, 702/143, 147, 148, 149, 151, 159; 701/1, 301, 302; 342/52, 54, 104, 118, 127; 340/903

[56] References Cited

U.S. PATENT DOCUMENTS

| 5,314,037 | 5/1994 | Shaw et al. ............................... 180/169 |
| 5,343,206 | 8/1994 | Ansaldi et al. ............................ 342/70 |
| 5,410,304 | 4/1995 | Hahn et al. .............................. 340/903 |
| 5,467,283 | 11/1995 | Butsuen et al. .......................... 364/461 |
| 5,467,284 | 11/1995 | Yoshioka et al. ........................ 364/461 |
| 5,510,990 | 4/1996 | Hibino et al. ........................ 364/426.04 |
| 5,529,138 | 6/1996 | Shaw et al. ............................. 180/169 |
| 5,646,612 | 7/1997 | Byon ...................................... 340/903 |
| 5,745,870 | 4/1998 | Yamamoto et al. .................... 701/301 |
| 5,754,099 | 5/1998 | Nishimura et al. ..................... 340/435 |

*Primary Examiner*—Patrick Assouad
*Attorney, Agent, or Firm*—Oblon, Spivak, McClelland, Maier & Neustadt, P.C.

[57] ABSTRACT

Method of measuring the yaw velocity of a vehicle. An estimate of the yaw velocity is made by either a gyrometer or a steering angle sensor. This estimate is selectively readjusted when a fixed obstacle is sensed using periodic updates of the longitudinal speed of the vehicle, the distance from the fixed obstacle and the relative transverse speed of the obstacle.

7 Claims, 1 Drawing Sheet

METHOD FOR MEASURING THE YAW VELOCITY OF A VEHICLE

BACKGROUND OF THE INVENTION

1. Field of the Invention

This invention concerns measurement of the loop speed of a vehicle, notably with a view to predicting its path.

2. Discussion of the Background

The loop speed of a vehicle can be estimated most simply by means of a gyrometer or from its longitudinal speed and its steering angle.

Through patent FR 2,702,570, in the applicant's name, one learns of a process of detection and selection of obstacles presenting the risk of collision with a vehicle, called following vehicle. The process described in that patent uses a horizontal scanning telemeter for determining the radius of curvature and angular speed of the following vehicle, as well as an odometer for measuring its longitudinal speed. On the basis of those measurements, the system used estimates the danger of a collision between the following vehicle and a selected obstacle, by comparing their respective paths.

The measurement of angular speed made according to patent FR 2,702,570 from measurements taken with a horizontal scanning telemeter is precise. However, it is not permanent, since it assumes that an obstacle has been detected and selected. Furthermore, that measurement is marred by inaccuracies, linked to the presence of other selectable obstacles in the field of the telemeter.

This invention is aimed at permanently obtaining a measurement of the angular speed of a vehicle as precise as possible.

SUMMARY OF THE INVENTION

It concerns a process of measurement of the loop speed of a vehicle. That process is characterized in that the course of said speed permanently measured by an installed instrument is selectively readjusted by means of indications corresponding respectively to the longitudinal speed of the vehicle, to its longitudinal distance from a fixed obstacle present on its path and to the relative transverse speed of the same fixed obstacle in relation to the vehicle.

According to one preferred embodiment of the invention, Dl and Vt are indicated by a horizontal scanning telemeter, in case of detection of a fixed obstacle on the path of the vehicle.

In accordance with the invention, the loop speed of the vehicle can be estimated by a steering wheel sensor.

The invention also proposes that this estimate be made directly by means of an installed gyrometer indicating the instantaneous loop speed of the vehicle.

To carry out readjustment of the angular speed, it is provided in particular that the measurement of Dl, Vl and Vt by the telemeter should be used to deduce the path curve $\chi$ of the vehicle.

In that case, the value of the curve $\chi$ so determined can be used advantageously to readjust the value of the deviation from origin b of the steering angle.

Other characteristics and advantages of the invention will be clearly apparent on reading of the following description of one particular embodiment of the invention, in connection with the attached drawings, on which:

DETAILED DESCRIPTION OF THE PREFERRED EMBODIMENTS

Figures 1, 2:
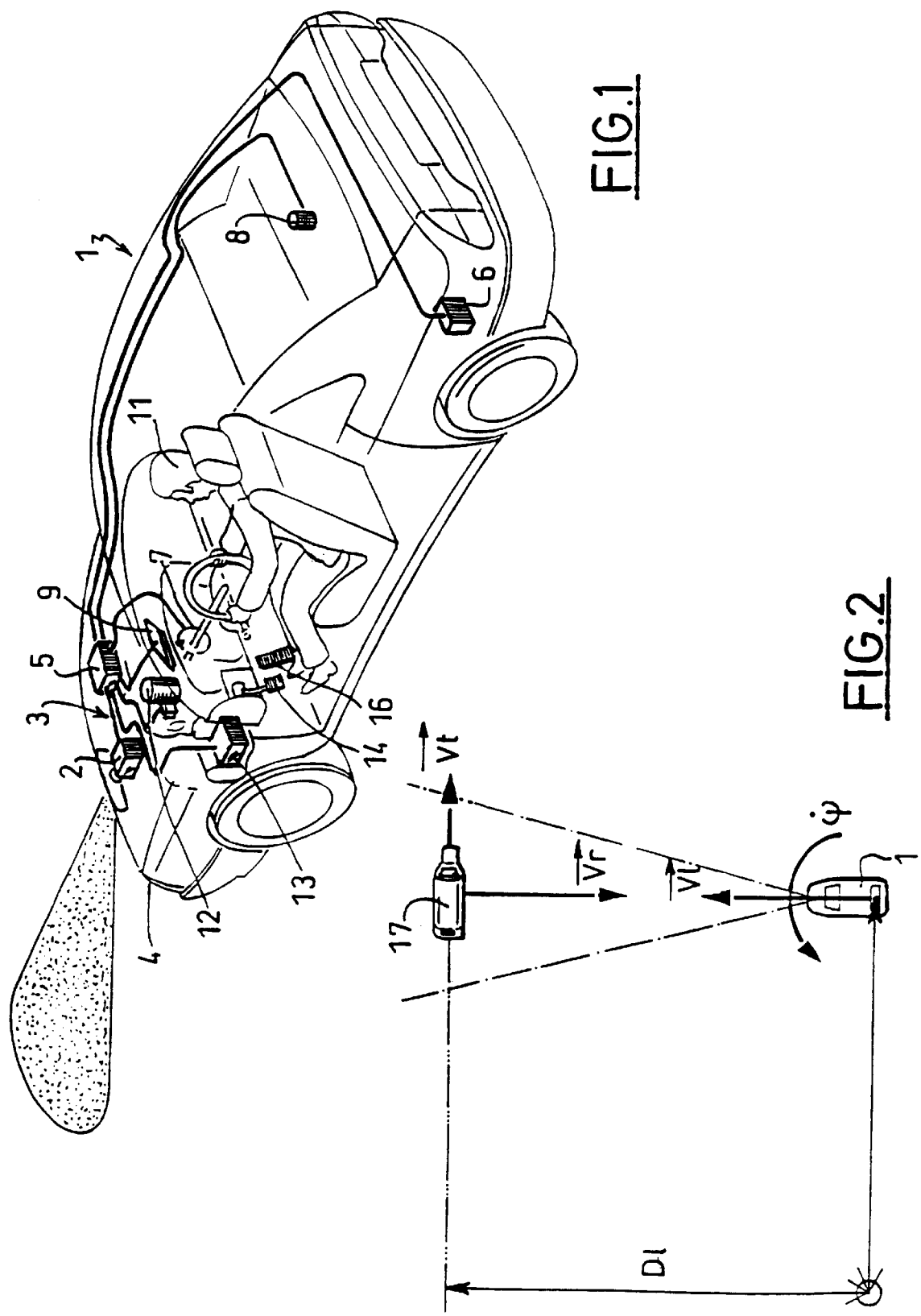
FIG. 1 schematically represents a motor vehicle equipped with detection and measuring instruments making it possible to use the invention, and FIG. 2 specifies the nature of the measurements taking place in its use.

FIG. 1 indicates the presence on the vehicle 1 of an obstacle detection apparatus 2, such as an infrared laser telemeter of L.I.D.A.R. (Light Detecting and Ranging) type placed in the center part of the front unit 3. Of course, the center L.I.D.A.R. is not exclusively used, and one can just as well envisage using other types of obstacle detectors or integrating the detector in one of the two optical units 4 of the vehicle, without departing from the scope of the invention. A computer 5 receives the return information from the telemeter 2, notably when the latter has detected an obstacle on the path of the vehicle, as well as the signals emitted by a longitudinal speed sensor of the vehicle 6, such as a wheel sensor of the A.B.S. system (Anti-Blokieuring-System) or any other speed sensor of the vehicle, by a steering angle sensor 7 or by a gyrometer 8 indicating the loop speed of the vehicle. That installation, supplemented possibly by a high head display 9 through which the driver 11 can have a visual warning signal in his usual field of vision, makes it possible in known fashion to detect the obstacles present on the path of the vehicle, to select certain particularly hazardous obstacles among the latter by comparing their relative longitudinal speed (cf. FIG. 2) with the longitudinal speed Vl of the vehicle, and to secure remote control of the vehicle in relation to certain selected obstacles, such as vehicles traveling on the same traffic lane, by acting directly on the control unit of the throttle valve 12 and/or on the control housing of the automatic transmission 13 and on the brake acceleration pedals 14, 16.

FIG. 2 reveals the indicators taken into consideration to define the path of a vehicle 1 in relation to an obstacle 17 detected in the field of observation of a telemeter. The vehicle moves at a longitudinal speed Vl estimated by the above-mentioned speed sensor 6 and vectorially oriented in the direction of the obstacle 17, in the event that the obstacle in question is sufficiently distant from the vehicle. Furthermore it possesses a loop speed $\dot{\Psi}$ linked to the curvature of its path $\chi$ and to the longitudinal speed Vl by the relation $$\chi = \frac{\dot{\Psi}}{Vl}.$$

Finally, the telemeter 2 is capable of measuring the longitudinal distance Dl of any detected obstacle and of measuring the relative longitudinal speed Vr and the relative transverse speed Vt of the detected obstacle 17 in relation to the vehicle 1. By comparing the longitudinal speed Vl of the vehicle 1 measured by the sensor 6 and the relative longitudinal speed Vr of the obstacles, the above-mentioned computer 5 is then capable of selecting the fixed obstacles, since for the latter Vr=Vl.

Furthermore, it is known that for these fixed obstacles, the loop speed $\dot{\Psi}$ of the vehicle is precisely linked to their passing speed or transverse speed Vt by the relation $$\dot{\Psi} = \frac{Vt}{Dl}.$$

The loop speed $\dot{\Psi}$ of the vehicle can then be determined by the telemeter with precision every time a fixed obstacle is detected, thanks to the application in the computer 5 of that relation to the values Dl and Vt measured by the latter.

In addition, considering that the loop speed $\dot{\Psi}$ of the vehicle is linked to the curvature of its path $\chi$ by the relation $$\chi = \frac{\dot{\Psi}}{Vl},$$

it is then possible to determine the exact value of the curvature, that is, $$\chi = \frac{Vt}{Cl \times Vl}.$$

When the vehicle 1, furthermore is equipped with a steering angle sensor 7 or a gyrometer 8, either of those apparatuses makes it possible to estimate in real time the loop speed of the vehicle. In practice, such estimates prove too imprecise to be applied without correction to calculation of the path of the vehicle and to the prediction of collisions with obstacles occurring in that path. This invention is therefore intended to take advantage of the measurements made by the telemeter on the detection of fixed obstacles in order to readjust the estimate of loop speed supplied by a gyrometer or a steering angle sensor.

In the case of a gyrometer directly supplying an estimate of the loop speed of the vehicle, the desired correction can be made by readjusting the estimates to the exact measurements established by means of a telemeter, on the detection of a fixed obstacle.

If, on the other hand, the vehicle 1 is equipped with a steering angle sensor, it is known that the steering angle measured $\delta$ is linked to the curvature $\chi$ by the kindred relation $\delta=a\chi+b$, in which a depends on the gear reduction and wheelbase of the vehicle and b is a deviation from origin, a function of the error introduced by the sensor 7 itself and by transverse forces (wind, centrifugal force, takes) undergone by the vehicle.

According to the invention, the curvature of the path $\chi$ is estimated from the measurement $\delta$ of the sensor 7 in the absence of a fixed obstacle and these measurements are readjusted by recalculating the deviation from origin b on the basis of the curvature determined by the telemeter when the fixed obstacle is detected. Between the detection of two fixed obstacles, the measurement of curvature $\chi$ from the steering angle $\delta$ thus benefits from the correction introduced in the deviation from origin b thanks to the last precise punctual measurement of the latter, obtained by means of the telemeter.

In order to make the readjustments of deviation of steering angle b, the invention proposes, notably using the methods of calculation known as least squares methods, but it is also possible to envisage the application of other algorithms requiring, according to a preestablished periodicity or solely as a function of the obstacles detected, a correction or "hybridation" of the value of the curve determined by the steering angle sensor, or of the value of the angular speed estimated by the gyrometer, by means of values calculated by the telemeter.

In conclusion, the invention makes it possible to obtain permanently a measurement of the loop value of a vehicle, sufficiently reliable to make it possible to predict the risks of collision of the vehicle with all of the obstacles presenting a risk of collision. This reliability is based on the precision of measurements made by the telemeter on the fixed obstacles encountered and the corrections introduced as often as possible in the usual measurements of the curve or of the loop speed of the vehicle.

I claim:

1. A process for measuring a loop speed of a vehicle, comprising the steps of:

providing a loop speed measuring device which provides an estimate of said loop speed;

adjusting said loop speed measurement device when a fixed obstacle is detected in a path of the vehicle, said adjusting being related to a longitudinal speed of the vehicle, a longitudinal distance from the vehicle to the fixed obstacle and a relative transverse speed of the fixed obstacle in relation to the vehicle.

2. The process for measuring according to claim 1, wherein the longitudinal speed, longitudinal distance and relative transverse speed are detected by a horizontal scanning telemeter.

3. The process for measuring according to claim 1, wherein said loop speed measuring device is a steering angle sensor.

4. The process for measuring according to claim 1, wherein said loop speed measuring device is a gyrometer.

5. The process for measuring according to claim 1, wherein said longitudinal speed, said longitudinal distance and said relative transverse speed are used to determine a path curve of the vehicle.

6. A process for measuring according to claim 5, wherein the path curve is determined so as to adjust the value of deviation of the steering angle according to the equation $\delta=a\chi+b$, where $\delta$ is a steering angle, $\chi$ is the path curve, a is the coefficient of gear reduction of the vehicle and b is the deviation of the steering angle.

7. A process for measuring according to claim 6, wherein the adjusting of the deviation of the steering angle uses a least squares method.

* * * * *